(12) United States Patent
Nagpal

(10) Patent No.: US 7,214,754 B2
(45) Date of Patent: May 8, 2007

(54) POLYMERIZABLE POLYOL (ALLYL CARBONATE) COMPOSITIONS

(75) Inventor: Vidhu J. Nagpal, Murrysville, PA (US)

(73) Assignee: PPG Industries Ohio, Inc., Cleveland, OH (US)

(*) Notice: Subject to any disclaimer, the term of this patent is extended or adjusted under 35 U.S.C. 154(b) by 0 days.

(21) Appl. No.: 10/336,118

(22) Filed: Jan. 3, 2003

(65) Prior Publication Data

US 2003/0173551 A1   Sep. 18, 2003

Related U.S. Application Data

(63) Continuation-in-part of application No. 09/459,796, filed on Dec. 13, 1999, now abandoned.

(51) Int. Cl.
C08F 26/02    (2006.01)
C08F 226/02   (2006.01)
G02B 1/04     (2006.01)
G02B 1/10     (2006.01)

(52) U.S. Cl. .................. 526/301; 348/902; 359/642

(58) Field of Classification Search ............. 526/301; 348/902; 359/642
See application file for complete search history.

(56) References Cited

U.S. PATENT DOCUMENTS

| | | | |
|---|---|---|---|
| 2,370,567 A | 2/1945 | Muskat et al. ............. 525/61 |
| 2,403,113 A | 7/1946 | Muskat et al. ............. 526/295 |
| 3,361,706 A | 1/1968 | Meriwether et al. ........ 252/586 |
| 3,562,172 A | 2/1971 | Ono et al. ................. 252/300 |
| 3,567,605 A | 3/1971 | Becker .................... 204/158 |
| 3,578,602 A | 5/1971 | Ono et al. ................. 252/300 |
| 4,166,043 A | 8/1979 | Uhlmann et al. ........... 252/300 |
| 4,215,010 A | 7/1980 | Hovey et al. .............. 252/300 |
| 4,342,668 A | 8/1982 | Hovey et al. .............. 252/586 |
| 4,360,653 A | 11/1982 | Stevens et al. ............ 526/301 |
| 4,367,170 A | 1/1983 | Uhlmann et al. ........... 252/586 |
| 4,443,588 A | 4/1984 | Fukuda et al. ............ 526/301 |
| 4,613,656 A | 9/1986 | Tang ...................... 526/294 |
| 4,637,698 A | 1/1987 | Kwak et al. ............... 351/163 |
| 4,686,266 A | 8/1987 | Tang ...................... 526/193 |
| 4,742,133 A | 5/1988 | Tang et al. ............... 526/235 |
| 4,816,584 A | 3/1989 | Kwak et al. ............... 544/71 |
| 4,818,096 A | 4/1989 | Heller et al. .............. 351/163 |
| 4,826,977 A | 5/1989 | Heller et al. .............. 544/70 |
| 4,835,233 A | 5/1989 | Renzi et al. .............. 526/301 |
| 4,880,667 A | 11/1989 | Welch .................... 427/160 |
| 4,931,219 A | 6/1990 | Kwiatkowski et al. ...... 252/586 |
| 4,931,220 A | 6/1990 | Haynes et al. ............ 252/586 |
| 4,994,208 A | 2/1991 | McBain et al. ............ 252/586 |
| 5,066,818 A | 11/1991 | Van Gemert et al. ....... 549/389 |
| 5,084,529 A | 1/1992 | Crano .................... 525/455 |
| 5,110,881 A | 5/1992 | McBain et al. ............ 525/455 |
| 5,200,483 A | 4/1993 | Selvig .................... 526/301 |
| 5,221,721 A | 6/1993 | Selvig .................... 526/193 |
| 5,235,014 A | 8/1993 | Chen et al. ............... 526/301 |
| 5,236,978 A | 8/1993 | Selvig et al. .............. 524/81 |
| 5,238,931 A | 8/1993 | Yoshikawa et al. ......... 514/184 |
| 5,246,630 A | 9/1993 | Selvig .................... 252/586 |
| 5,274,132 A | 12/1993 | Van Gemert .............. 549/389 |
| 5,384,077 A | 1/1995 | Knowles .................. 252/586 |
| 5,405,958 A | 4/1995 | Van Gemert ............... 544/71 |
| 5,429,774 A | 7/1995 | Kumar .................... 252/586 |
| 5,466,398 A | 11/1995 | Van Gemert et al. ....... 252/586 |
| 5,663,279 A | 9/1997 | Kuiper et al. ............. 528/196 |
| 6,075,108 A | 6/2000 | Guo ...................... 526/312 |
| 6,077,921 A | 6/2000 | Nagpal et al. ............ 526/314 |
| 6,423,803 B1 | 7/2002 | Nagpal et al. ............ 526/314 |

FOREIGN PATENT DOCUMENTS

| JP | 02-108657 | 4/1990 |
|---|---|---|
| WO | 99/38899 | 8/1999 |
| WO | 01/42321 | 6/2001 |

*Primary Examiner*—Rabon Sergent
(74) *Attorney, Agent, or Firm*—Deborah M. Altman; Carol A. Marmo

(57) ABSTRACT

A polymerizable composition is described, which composition comprises a major amount of a polyol(allyl carbonate) monomer, e.g., diethylene glycol bis(allyl carbonate) monomer, and a minor amount of a radically polymerizable second monomer represented by the general formula,

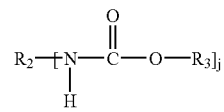

wherein $R_2$ is a polyvalent linking group that is free of urethane linkages, e.g., $R_2$ may be a residue of a polyisocyanate, such as isophorone diisocyanate; $R_3$ is a residue of a material having a single hydroxy group and at least one allyl group, $R_3$ being free of urethane linkages, e.g., $R_3$ may be a residue of a poly(alkylene glycol) allyl ether, such as poly(1,2-propylene glycol) allyl ether; and j is a number from 2 to 4. The second monomer may also be present in the composition in an amount at least sufficient such that a polymerizate, e.g., a plus ophthalmic lens, obtained from the composition is substantially free of tinting defects, e.g., ferns and/or moons.

29 Claims, 1 Drawing Sheet

POLYMERIZABLE POLYOL (ALLYL CARBONATE) COMPOSITIONS

This application is a Continuation-In-Part (CIP) of U.S. Pat. application having Ser. No. 09/459,796 which was filed on Dec. 13, 1999 and is abandoned in the United States Patent and Trademark Office.

DESCRIPTION OF THE INVENTION

The present invention relates to a polymerizable composition. More particularly, the present invention relates to a polymerizable composition comprising polyol(allyl carbonate) monomer and a urethane having at least two allyl or substituted allyl groups. The present invention relates also to polymerizates, e.g., lenses, obtained from the polymerizable compositions.

Polymerizable organic compositions based on polyol(allyl carbonate), particularly diethylene glycol bis(allyl carbonate), and polymerizates obtained therefrom are well known in the art. Polymerizates of polymerizable organic compositions based on homopolymers of diethylene glycol bis(allyl carbonate) possess excellent clarity, good flexibility and abrasion resistance. Examples of applications for which such polymerizates may be used include, ophthalmic lenses, sunglasses, and automotive and aircraft transparencies. It has been observed that tinting of polymerizates prepared from such compositions by surface impregnation of dyes can, in certain instances, result in an uneven tinting of the surface. Such uneven tinting is referred to as tinting failure.

When tinting failure occurs, it is often manifested as visually observable defects on the tinted surface(s) of the polymerizate, which are commonly referred to as "ferns" or "moons." In the case of tinted ophthalmic lenses, such as tinted ophthalmic lenses having a positive diopter, i.e., plus lenses, and non-corrective lenses, e.g., sunglasses, such tinting failure often results in rejection and scrapping of the tinted lens. A solution to tinting failure is desirable in order to avoid the economic loss that results from the scrapping of lenses having tinting defects.

U.S. Pat. Nos. 4,994,208, 5,084,529, 5,110,881, 5,221,721, 5,236,978 and 5,246,630 describe polymerizable compositions composed of polyol(allyl carbonate) monomer and at least 10 weight percent of aliphatic polyurethanes, the terminal portions of which contain allyl functional groups. U.S. Pat. No. 5,200,483 describes organic resin compositions containing polyol(allyl carbonate) monomer and a mixture of aliphatic urethanes, the terminal portions of which contain allyl or acrylyl functional groups.

It has now been discovered that cured polymerizates prepared from the polymerizable compositions of the present invention are substantially free of tinting defects, for example, tinting defects referred to in the art as ferns or moons. In accordance with the present invention there is provided a polymerizable composition comprising:

(a) a major amount of a radically polymerizable first monomer represented by the following general formula I, R—[—O—C(O)—O—R$_1$]$_i$   I wherein R is a polyvalent residue of a polyol having at least two hydroxy groups, R$_1$ is an allyl or substituted allyl group, and i is a whole number from 2 to 4; and (b) a minor amount of a radically polymerizable second monomer represented by the following general formula II,

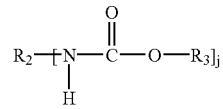

wherein R$_2$ is a polyvalent linking group that is free of urethane linkages; R$_3$ is a residue of a material having a single hydroxy group and at least one allyl group, R$_3$ being free of urethane linkages, acryloyl groups and methacryloyl groups; and j is a number from 2 to 4, e.g., 2, 3 or 4.

In an embodiment of the present invention, said second monomer (b) is present in said composition in an amount at least sufficient such that a polymerizate of said composition is substantially free of tinting defects.

The features that characterize the present invention are pointed out with particularity in the claims, which are annexed to and form a part of this disclosure. These and other features of the invention, its operating advantages and the specific objects obtained by its use will be more fully understood from the following detailed description and the accompanying illustrative drawing.

Other than in the operating examples, or where otherwise indicated, all numbers expressing quantities of ingredients, reaction conditions, etc. used in the specification and claims are to be understood as modified in all instances by the term "about."

DETAILED DESCRIPTION OF THE INVENTION

Figure 1:
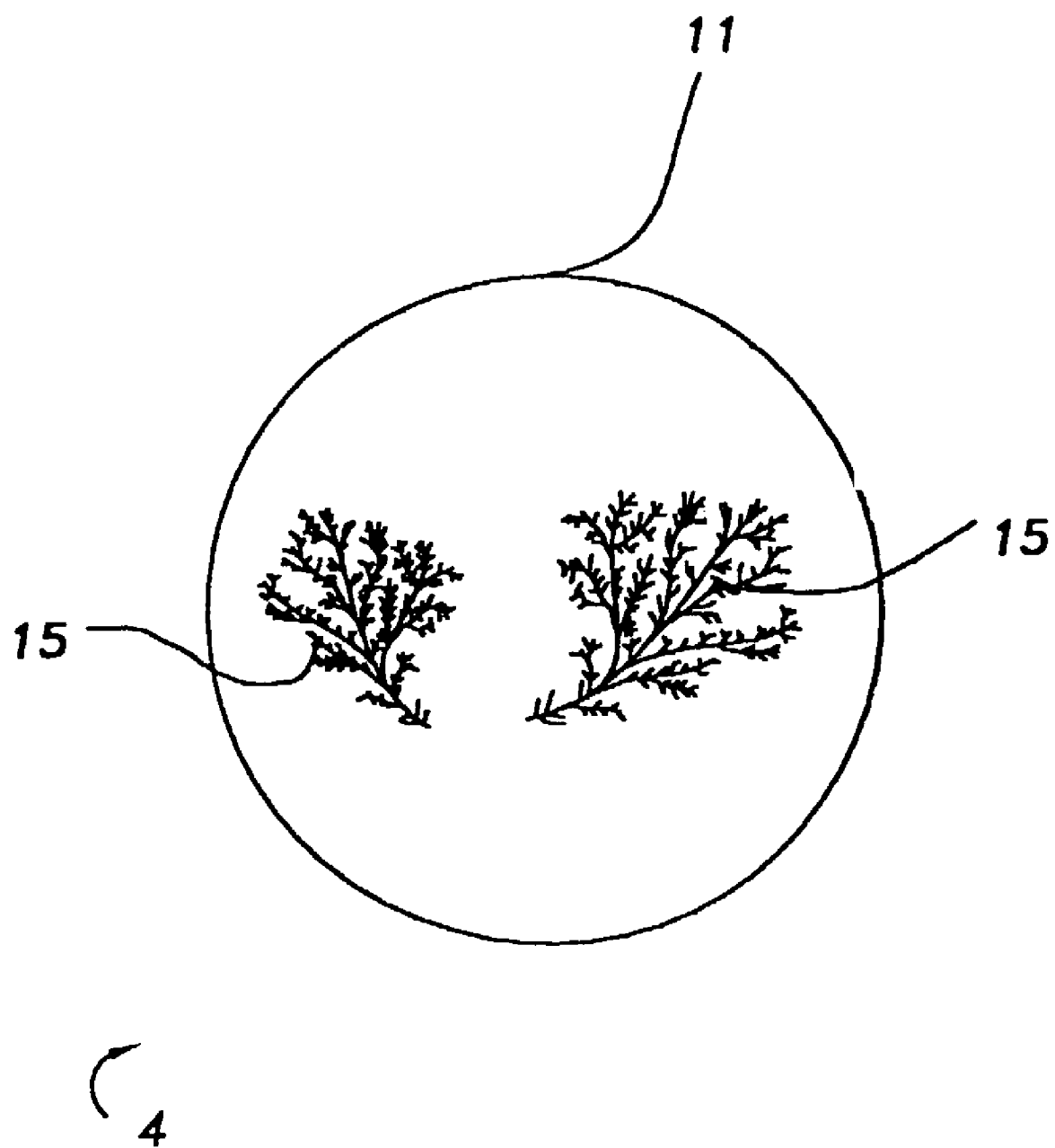
FIG. 1 is a representation of a negative image of a tinted lens having tinting defects.

In an embodiment of the present invention, the second monomer described with reference to general formula II is present in the polymerizable compositions in an amount at least sufficient such that polymerizates prepared from such compositions are substantially free of tinting defects. As used herein and in the claims, the term "tinting defects" and similar terms refer generally to a visually observable uneven distribution of dye over the surface of a tinted polymerizate, such as a tinted lens. More particularly, tinting defects are often visually observable as lighter colored or untinted surface patterns, sometimes in the form of ferns or moons.

Tinting defects in the form of ferns can be further described with reference to FIG. 1. The tinted polymerizate 4 of FIG. 1 is a tinted plus lens 11, prepared from diethylene glycol bis(allyl carbonate) monomer, and having tinting defects 15 thereon. For purposes of illustration, the tinting defects 15 of FIG. 1 are shown as a negative image. As used herein, by "plus lens" is meant a lens having a positive (+) diopter, i.e., a lens having a positive focal length or real focal point. The tinting defects shown in the lens depicted in FIG. 1 were observed in a lens having a plus five (+5) diopter.

Tinting defects in the form of moons (not shown in FIG. 1) are typically observed as a series of concentric circles of varying tint strength on the surface of the tinted lens. In some instances a tinted lens will exhibit a combination of both moon and fern type tinting defects.

The occurrence of tinting defects with polymerizates prepared from polyol(allyl carbonate) monomers is a largely statistical phenomenon. Accordingly, in order to determine if a polymerizable composition can be used to prepare polymerizates that are "substantially free of tinting defects," more than one polymerizate, e.g., several lenses, should be prepared. Optionally, a set of comparative polymerizates may also be prepared under similar conditions, e.g., using the same cure cycle, from a composition that is known to result in tinting defects. The specific number of polymerizates that must be prepared is often determined by trial and error. In the case of ophthalmic lenses, typically between 10 and 100 lenses are prepared to determine if they are substantially free of tinting defects. Such a determination is described in further detail in the Examples herein. Typically, a set of polymerizates, e.g., 100 ophthalmic plus lenses, prepared from a polymerizable composition according to the present invention, is considered to be substantially free of tinting defects if 10 percent or less, preferably 5 percent or less, and more preferably 0 percent of the tinted polymerizates have tinting defects, such as ferns.

Second monomer (b) is present in the polymerizable composition of the present invention in a minor amount (e.g., from 0.1 percent by weight to 49 percent by weight, based on the total weight of the composition). Typically, second monomer (b) is present in the composition of the instant invention in an amount of at least 0.1 percent by weight, preferably at least 0.2 percent by weight, and more preferably at least 0.3 percent by weight, based on the total weight of the composition. Second monomer (b) is also typically present in the composition of the present invention in an amount of less than 10 percent by weight, preferably less than 5 percent by weight and more preferably less than 3 percent by weight, based on the total weight of the composition. The amount of second monomer (b) present in the composition of the present invention may range between any combination of these values, inclusive of the recited values, e.g., from 0.1 percent by weight to 10 percent by weight or from 0.3 percent by weight to 3 percent by weight, based on the total weight of the composition.

With reference to general formula II, second monomer (b) is distinguishable from polyurethanes having terminal allyl functional groups as described in, for example, U.S. Pat. Nos. 4,994,208, 5,084,529, 5,110,881, 5,221,721, 5,236,978 and 5,246,630. In general formula II, $R_2$ and $R_3$ are each free of urethane linkages, more particularly, $R_2$ and $R_3$ are each free of internal urethane linkages. As used herein and in the claims, the term "urethane linkage" is meant to refer to the following structural linkage, —N(H)—C(O)—O—. In the case when $R_2$ is a residue of a polyisocyanate, second monomer (b) can be described as a polyisocyanate that is capped with the mono-hydroxy functional material of which $R_3$ is a residue.

Depending on the method by which second monomer (b) is prepared, $R_2$ may be a residue of, for example, a polyisocyanate, i.e., a material having at least two isocyanate groups, or a polyamine, i.e., a material having at least two primary amine groups. When the second monomer is prepared by capping a polyisocyanate with the mono-hydroxy functional material of which $R_3$ is a residue, $R_2$ is a residue of a polyisocyanate. The second monomer may also be prepared by first reacting the mono-hydroxy functional material of which $R_3$ is a residue with phosgene to form the corresponding chloroformate, which is then reacted with a polyamine, in which case $R_2$ is a residue of a polyamine.

In an embodiment of the present invention, $R_2$ is a residue of a polyisocyanate having at least two isocyanate groups, and the polyisocyanate may be selected from aromatic polyisocyanates, aliphatic polyisocyanates, cycloaliphatic polyisocyanates and mixtures thereof. As used herein and in the claims, the term "polyisocyanate" is meant to be inclusive of dimers and trimers of polyisocyanates, for example, trimers of diisocyanates containing a core isocyanurate ring.

Classes of aromatic polyisocyanates of which $R_2$ may be a residue include, for example, aromatic polyisocyanates wherein the isocyanate groups are not bonded directly to the aromatic ring, e.g., α,α'-xylene diisocyanate; and aromatic polyisocyanates wherein the isocyanate groups are bonded directly to the aromatic ring, e.g., benzene diisocyanate.

Examples of aromatic polyisocyanates having isocyanate groups bonded directly to the aromatic ring, of which $R_2$ may be a residue include, but are not limited to, phenylene diisocyanate, ethylphenylene diisocyanate, isopropylphenylene diisocyanate, dimethylphenylene diisocyanate, diethylphenylene diisocyanate, diisopropylphenylene diisocyanate, trimethylbenzene triisocyanate, benzene triisocyanate, naphthalene diisocyanate, methylnaphthalene diisocyanate, biphenyl diisocyanate, ortho-tolidine diisocyanate, 4,4'-diphenylmethane diisocyanate, bis(3-methyl-4-isocyanatophenyl)methane, bis(isocyanatophenyl)ethylene, 3,3'-dimethoxy-biphenyl-4,4'-diisocyanate, triphenylmethane triisocyanate, polymeric 4,4'-diphenylmethane diisocyanate, naphthalene triisocyanate, diphenylmethane-2,4,4'-triisocyanate, 4-methyldiphenylmethane-3,5,2',4',6'-pentaisocyanate, diphenylether diisocyanate, bis(isocyanatophenylether) ethyleneglycol, bis(isocyanatophenylether)-1,3-propyleneglycol, benzophenone diisocyanate, carbazole diisocyanate, ethylcarbazole diisocyanate and dichlorocarbazole diisocyanate. Examples of aromatic polyisocyanates wherein the isocyanate groups are not bonded directly to the aromatic ring, of which $R_2$ may be a residue include, but are not limited to, bis(isocyanatoethyl)benzene, α,α,α',α'-tetramethylxylene diisocyanate, 1,3-bis(1-isocyanato-1-methylethyl)benzene, bis(isocyanatobutyl)benzene, bis(isocyanatomethyl)naphthalene, bis(isocyanatomethyl)diphenyl ether, bis(isocyanatoethyl)phthalate, mesitylene triisocyanate and 2,5-di(isocyanatomethyl)furan.

Aliphatic polyisocyanates of which $R_2$ may be a residue may be selected from, for example, ethylene diisocyanate, trimethylene diisocyanate, tetramethylene diisocyanate, hexamethylene diisocyanate, octamethylene diisocyanate, nonamethylene diisocyanate, 2,2'-dimethylpentane diisocyanate, 2,2,4-trimethylhexane diisocyanate, decamethylene diisocyanate, 2,4,4,-trimethylhexamethylene diisocyanate, 1,6,11-undecanetriisocyanate, 1,3,6-hexamethylene triisocyanate, 1,8-diisocyanato-4-(isocyanatomethyl)octane, 2,5,7-trimethyl-1,8-diisocyanato-5-(isocyanatomethyl)octane, bis(isocyanatoethyl)-carbonate, bis(isocyanatoethyl)ether, 2-isocyanatopropyl-2,6-diisocyanatohexanoate, lysinediisocyanate methyl ester and lysinetriisocyanate methyl ester.

In an embodiment of the present invention, $R_2$ of general formula II is a residue of a cycloaliphatic polyisocyanate. Examples of cycloaliphatic polyisocyanates of which $R_2$ may be a residue include, but are not limited to, isophorone diisocyanate, cyclohexane diisocyanate, methylcyclohexane diisocyanate, bis(isocyanatomethyl)cyclohexane, bis(isocyanatocyclohexyl)methane, bis(isocyanatocyclohexyl)-2,2-propane, bis(isocyanatocyclohexyl)-1,2-ethane, 2-isocyanatomethyl-3-(3-isocyanatopropyl)-5-isocyanatomethyl-bicyclo[2.2.1]-heptane, 2-isocyanatomethyl-3-(3-isocyanatopropyl)-6-isocyanatomethyl-bicyclo[2.2.1]-heptane, 2-isocyanatomethyl-2-(3-isocyanatopropyl)-5-isocyanatomethyl-bicyclo[2.2.1]-heptane, 2-isocyanatomethyl-2-(3-isocyanatopropyl)-6-isocyanatomethyl-bicyclo[2.2.1]-heptane, 2-isocyanatomethyl-3-(3-isocyanatopropyl)-6-(2-isocyanatoethyl)-bicyclo[2.2.1]-heptane, 2-isocyanatomethyl-2-(3-isocyanatopropyl)-5-(2-isocyanatoethyl)-bicyclo[2.2.1]-heptane and 2-isocyanatomethyl-2-(3-isocyanatopropyl)-6-(2-isocyanatoethyl)-bicyclo[2.2.1]-heptane. In a preferred embodiment of the present invention, $R_2$ is a residue of a cycloalphatic diisocyanate selected from, for example, isophorone diisocyanate, cyclohexane diisocyanate, methylcyclohexane diisocyanate, bis(isocyanatomethyl)cyclohexane, bis(isocyanatocyclohexyl)methane, bis(isocyanatocyclohexyl)-2,2-propane, bis(isocyanatocyclohexyl)-1,2-ethane, and mixtures thereof. When $R_2$ is a residue of a diisocyanate, such as a cycloaliphatic diisocyanate, j of general formula II is 2.

Classes of polyamines of which $R_2$ may be a residue, include, aromatic polyamines, aliphatic polyamines, cycloaliphatic polyamines, each having at least two primary amines, and mixtures thereof. As is known to the skilled artisan, polyisocyanates are typically prepared from the corresponding polyamine precursors having two or more primary amine groups. Accordingly, specific examples of polyamines within these recited classes include, but are not limited to, polyamine precursors corresponding to those polyisocyanates as recited previously herein.

With further reference to general formula II, $R_3$ is a residue of a material having a single hydroxy group and one or more allyl groups. The mono-hydroxy functional material of which $R_3$ is a residue is free of acryloyl groups and methacryloyl groups. The allyl group may be an unsubstituted allyl group or a substituted allyl group, as represented by the following general formula III, $$H_2C=C(R_4)-CH_2-\qquad\qquad III$$

wherein $R_4$ is hydrogen, halogen or a $C_1$ to $C_4$ alkyl group. More typically, $R_4$ is hydrogen and consequently general formula III represents the unsubstituted allyl group, $H_2C=CH-CH_2-$. More specifically, the allyl group of the material having a single hydroxy group, of which $R_3$ is a residue, may be an allyl ether, an allyl carbonate or an allyl ester group. The material of which $R_3$ is a residue typically has at least one allyl ether group.

The mono-hydroxy functional material of which $R_3$ is a residue may be selected from aromatic alcohols, aliphatic alcohols, cycloaliphatic alcohols, poly(alkylene glycols), each having at least one allyl group, and combinations thereof. Examples of aromatic alcohols having at least one allyl group include, but are not limited to, allyloxy phenol, e.g., 4-allyloxy phenol, allyloxybenzyl alcohol, e.g., 4-allyloxybenzyl alcohol, and 4-allyl-2,6-dimethoxyphenol. Cycloaliphatic alcohols having at least one allyl group of which $R_3$ may be a residue include, for example, allyloxymethyl cyclohexylmethanols, e.g., 4-allyloxymethyl cyclohexylmethanol.

Examples of aliphatic alcohols having at least one allyl group, of which $R_3$ may be a residue include, but are not limited to, allyl alcohol, substituted allyl alcohols, e.g., methallyl alcohol, allyl ethers of alkylene glycols, e.g., $C_2$–$C_4$ alkylene glycols, such as, ethylene glycol allyl ether and 1,2- or 1,3-propylene glycol allyl ether. A preferred class of aliphatic alcohols, of which $R_3$ may be a residue, are poly(allyl ethers) of aliphatic polyols, e.g., trimethylol propane di(allyl ether), trimethylol ethane di(allyl ether), pentaerythritol tri(allyl ether), and di-trimethylolpropane tri(allyl ether).

Poly(alkylene glycols) of which $R_3$ may be a residue include, for example, homopolymeric, block copolymeric, e.g., diblock and triblock copolymeric, and random copolymeric poly(alkylene glycols), such as poly($C_2$–$C_4$ alkylene glycols), having a single allyl ether group and a single hydroxy group. Examples of poly(alkylene glycol) allyl ethers of which $R_3$ may be a residue include, for example, poly(ethylene glycol) allyl ether, poly(1,2-propylene glycol) allyl ether, poly(1,2-butylene glycol) allyl ether, poly(ethylene glycol)-b-poly(1,2-propylene glycol) allyl ether, poly(1,2-propylene glycol)-b-poly(ethylene glycol) allyl ether, poly(1,2-butylene glycol)-b-poly(ethylene glycol) allyl ether, poly(ethylene glycol)-b-poly(1,2-butylene glycol) allyl ether and poly(ethylene glycol)-b-poly(1,2-propylene glycol)-b-poly(1,2-butylene) allyl ether.

The poly(alkylene glycol) allyl ethers of which $R_3$ may be a residue have at least 2 alkylene ether units. For example, diethylene glycol allyl ether has two (2) ethylene ether units, i.e., $H_2C=CHCH_2O-(-CH_2CH_2-O-)_2-H$. Typically, the poly(alkylene glycol) allyl ether has less than 100 alkylene ether units, e.g., less than 50, less than 20 or less than 15 alkylene ether units. The poly(alkylene glycol) allyl ether may have a number of alkylene ether units ranging between any combination of these values, inclusive of the recited values, e.g., from 2 to 100, 2 to 50, 2 to 20 or 2 to 15 alkylene ether units.

In an embodiment of the present invention, the material of which $R_3$ is a residue is selected from a $C_2$–$C_4$ alkylene glycol allyl ether, a poly($C_2$–$C_4$ alkylene glycol) allyl ether, trimethylol propane di(allyl ether), trimethylol ethane di(allyl ether), pentaerythritol tri(allyl ether), di-trimethylolpropane tri(allyl ether) and mixtures thereof. In a preferred embodiment of the present invention, the material of which $R_3$ is a residue is selected from poly(ethylene glycol) allyl ether, poly(1,2-propylene glycol) allyl ether and mixtures thereof.

The polymerizable organic composition of the present invention includes also a radically polymerizable first monomer as described above with reference to general formula I, which may be further described as a polyol(allyl carbonate) monomer. Polyol(allyl carbonate) monomers that may be used in the aforedescribed polymerizable organic composition are allyl carbonates of, for example, linear or branched aliphatic polyols, e.g., aliphatic glycol bis(allyl carbonate) compounds, and cycloaliphatic polyols. The scope of the present invention also includes allyl carbonates of aromatic polyols, e.g., 4,4'-isopropylidenediphenol bis(allyl carbonate). These monomers may further be described as unsaturated polycarbonates of polyols, e.g., glycols. The polyol (allyl carbonate) monomer may be prepared by procedures well known in the art, e.g., as described in U.S. Pat. Nos. 2,370,567 and 2,403,113.

In reference to general formula I, $R_1$ is an allyl group, which may be described with reference to general formula III. The allyl group $R_1$ of general formula I may be substituted at the 2-position with a halogen, most notably chlorine or bromine, or an alkyl group containing from 1 or 4, e.g., 1 to 2, carbon atoms, in which case $R_1$ is a substituted allyl group. More commonly, and with reference to general formula III, $R_4$ is hydrogen and consequently $R_1$ of general formula I is the unsubstituted allyl group, $H_2C=CH-CH_2-$.

With reference to general formula I, R is a polyvalent residue of a polyol, which can, for example, be an aliphatic or cycloaliphatic polyol, containing 2, 3 or 4 hydroxy groups. Typically, the polyol contains 2 hydroxy groups, i.e., a glycol. When the polyol is an aliphatic polyol, it may be linear or branched and contain from 2 to 10 carbon atoms.

Commonly, the aliphatic polyol is an alkylene glycol having from 2 to 4 carbons atoms, e.g., ethylene glycol, propylene glycol, trimethylene glycol, tetramethylene glycol, or a poly($C_2$–$C_4$ alkylene glycol), e.g., diethylene glycol, triethylene glycol, etc.

Specific examples of polyol(allyl carbonate) monomers that may be used in the present invention include, but are not limited to, ethylene glycol bis(2-chloroallyl carbonate), ethylene glycol bis(allyl carbonate), diethylene glycol bis(2-methylallyl carbonate), diethylene glycol bis(allyl carbonate), triethylene glycol bis(allyl carbonate), propylene glycol bis(2-ethylallyl carbonate), 1,3-propanediol bis(allyl carbonate), 1,3-butanediol bis(allyl carbonate), 1,4 butanediol bis(2-bromoallyl carbonate), dipropylene glycol bis(allyl carbonate), trimethylene glycol bis(2-ethylallyl carbonate), pentamethylene glycol bis(allyl carbonate), 1,4-cyclohexanediol bis(allyl carbonate) and 4,4'-isopropylidenebiscyclohexanol bis(allyl carbonate).

A preferred polyol(allyl carbonate) monomer in the composition of the present invention is diethylene glycol bis (allyl carbonate). Commercially available examples of diethylene glycol bis(allyl carbonate) monomers include CR-39® monomer and HIGH ADC CR-39® monomer, Chemical Abstracts (CAS) No. 142-22-3, available from PPG Industries, Inc.

A detailed description of polyol(allyl carbonate) monomers that may be used in the polymerizable organic compositions of the present invention may be found in U.S. Pat. No. 4,637,698, at column 3, line 33 through column 5, line 61. That disclosure is hereby incorporated by reference, and is summarized above.

As used in the present description with reference to the radically polymerizable monomer represented by general formula I, the term "polyol(allyl carbonate) monomer" and like names, e.g., diethylene glycol bis(allyl carbonate), is intended to mean and include the named monomers or prepolymers thereof and any related monomer or oligomer species contained therein.

The polyol(allyl carbonate) monomer is present in the polymerizable composition of the present invention in a major amount, e.g., from 51 percent by weight to 99.9 percent by weight, based on the total weight of the polymerizable composition. Typically, the polyol(allyl carbonate) monomer is present in the polymerizable composition of the present invention in an amount of at least 90 percent by weight, preferably at least 95 percent by weight, and more preferably at least 97 percent by weight, based on the total weight of the polymerizable composition. Also, the polyol (allyl carbonate) monomer is typically present in the composition in an amount of not greater than 99.9 percent by weight, preferably not greater than 99.8 percent by weight, and more preferably not greater than 99.7 percent by weight, based on the total weight of the polymerizable composition. The polyol(allyl carbonate) monomer may be present in the composition of the present invention in an amount ranging between any combination of these values, inclusive of the recited values.

Polymerization of the polymerizable composition of the present invention may be accomplished by adding to the composition an initiating amount of material capable of generating free radicals, such as organic peroxy compounds, i.e., an initiator. Methods for polymerizing polyol(allyl carbonate) compositions are well known to the skilled artisan and any of those well known techniques may be used to polymerize the aforedescribed polymerizable compositions.

Suitable examples of organic peroxy compounds, that may be used as initiators include: peroxymonocarbonate esters, such as tertiarybutylperoxy isopropyl carbonate; peroxydicarbonate esters, such as di(2-ethylhexyl) peroxydicarbonate, di(secondary butyl) peroxydicarbonate and diisopropylperoxydicarbonate; diacylperoxides, such as 2,4-dichlorobenzoyl peroxide, isobutyryl peroxide, decanoyl peroxide, lauroyl peroxide, propionyl peroxide, acetyl peroxide, benzoyl peroxide, p-chlorobenzoyl peroxide; peroxyesters such as t-butylperoxy pivalate, t-butylperoxy octylate, and t-butylperoxyisobutyrate; methylethylketone peroxide, acetylcyclohexane sulfonyl peroxide, and azobisisobutyronitrile. Preferred initiators are those that do not discolor the resulting polymerizate. A preferred initiator is diisopropyl peroxydicarbonate.

The amount of initiator used to initiate and polymerize the polymerizable compositions of the present invention may vary and will depend on the particular initiator used. Only that amount that is required to initiate and sustain the polymerization reaction is required, i.e., an initiating amount. With respect to the preferred peroxy compound, diisopropyl peroxydicarbonate, typically between 2.0 and 5.0 parts of that initiator per 100 parts of the polymerizable organic composition (phm) may be used. More usually, between 2.5 and 4.0 phm is used to initiate the polymerization. The amount of initiator and the consequent cure cycle should be adequate to produce a polymerizate having a 15 second Barcol hardness of at least 1, preferably, at least 4, e.g., from 4 to 35. Typically, the cure cycle involves heating the polymerizable organic composition in the presence of the initiator from room temperature to 85° C. over a period of from 15 hours to 30 hours.

Various conventional additives may be incorporated into the polymerizable composition of the present invention. Such conventional additives may include light stabilizers, heat stabilizers, ultraviolet light absorbers, mold release agents, pigments and flexibilizing additives that are not radically polymerizable, e.g., alkoxylated phenol benzoates and poly(alkylene glycol) dibenzoates. Conventional additives are typically present in the compositions of the present invention in amounts totaling less than 10 percent by weight, more typically less than 5 percent by weight, and commonly less than 3 percent by weight, based on the total weight of the polymerizable composition.

Polymerizates obtained from polymerization of polymerizable organic compositions of the present invention will be solid, transparent and substantially free of tinting defects. Solid articles that may be prepared from the polymerizable compositions of the present invention include, but are not limited to, optical lenses, such as plano and ophthalmic lenses, sun lenses or sunglasses, windows, automotive transparencies, e.g., windshields, sidelights and backlights, and aircraft transparencies.

In a non-limiting embodiment, a polymerizate obtained from polymerization of a polymerizable organic composition of the present invention can be used to prepare a photochromic article, such as a lens. In this embodiment, the polymerizate should be transparent to that portion of the electromagnetic spectrum which activates the photochromic substance(s) incorporated in the matrix, i.e., the wavelength of ultraviolet (UV) light that produces the colored or open form of the photochromic substance and that portion of the visible spectrum that includes the absorption maximum wavelength of the photochromic substance in its UV activated form, i.e., the open form. Non-limiting examples of photochromic substances that may be utilized with the polymerizates of the present invention can include but are not limited to organic photochromic compounds or substances containing same that may be incorporated, e.g., dissolved, dispersed or diffused into such polymerizates.

In a non-limiting embodiment, suitable organic photochromic substances for use in the present invention can have an activated absorption maximum within the visible range of greater than 590 nanometers, or between greater than 590 to 700 nanometers. These materials can exhibit a blue, bluish-green, or bluish-purple color when exposed to ultraviolet light in an appropriate solvent or matrix. Non-limiting examples of such substances can include but are not limited to spiro(indoline)naphthoxazines and spiro(indoline)benzoxazines. Further non-limiting examples of these and other such photochromic substances are described in the open literature. See, for example, U.S. Pat. Nos. 3,562,172; 3,578, 602; 4,215,010; 4,342,668; 5,405,958; 4,637,698; 4,931, 219; 4,816,584; 4,880,667; 4,818,096.

In another non-limiting embodiment, suitable organic photochromic substances for use in the present invention can include at least one absorption maximum within the visible range of between 400 and less than 500 nanometers. In a further non-limiting embodiment, the organic photochromic substance can include two absorption maxima. These materials can exhibit a yellow-orange color when exposed to ultraviolet light in an appropriate solvent or matrix. Non-limting examples can include chromenes, such as but not limited to benzopyrans and naphthopyrans. Further non-limiting examples of such chromenes are described in the open literature, see for example, U.S. Pat. Nos. 3,567,605; 4,826,977; 5,066,818; 4,826,977; 5,066,818; 5,466,398; 5,384,077; 5,238,931; and 5,274,132.

In an alternate non-limiting embodiment, suitable organic photochromic substances for use in the present invention can include those having an absorption maximum within the visible range of between 400 to 500 nanometers and another absorption maximum within the visible range of between 500 to 700 nanometers. These materials can exhibit color(s) ranging from yellow/brown to purple/gray when exposed to ultraviolet light in an appropriate solvent or matrix. Non-limiting examples of these substances can include benzopyran compounds, having substituents at the 2-position of the pyran ring and a substituted or unsubstituted heterocyclic ring, such as but not limited to a benzothieno or benzofurano ring fused to the benzene portion of the benzopyran. Non-limiting examples of such materials are disclosed in U.S. Pat. No. 5,429,774.

In a further non-limiting embodiment, the photochromic substance for use in the present invention can include photochromic organo-metal dithizonates, such as but not limited to (arylazo)-thioformic arylhydrazidates, such as but not limited to mercury dithizonates which are described in, for example, U.S. Pat. No. 3,361,706; and fulgides and fulgimides, such as but not limited to 3-furyl and 3-thienyl fulgides and fulgimides which are described in U.S. Pat. No. 4,931,220 at column 20, line 5 through column 21, line 38.

In a non-limiting embodiment, the photochromic substance for use in the present invention can include at least one naphthopyran. In a further non-limiting embodiment, the photochromic substance can include a mixture of at least two naphthopyrans.

The specific disclosures relating to such photochromic substances in the aforedescribed patents are incorporated herein, in toto, by reference. The photochromic articles of the present invention can include one photochromic substance or a mixture of photochromic substances, as can be appreciated by one skilled in the art. In a non-limiting embodiment, a mixture of photochromic substances can be used to attain an activated color such as a near neutral gray or brown.

Each of the photochromic substances described herein can be used in an amount and in a ratio (i.e., when mixtures are used) such that a polymerizate to which the photochromic substance is applied or incorporated exhibits a desired resultant color. In a non-limiting embodiment, a photochromic substance can be applied on or incorporated into the polymerizate to produce a substantially neutral color such as a shade of gray or brown when activated with unfiltered sunlight. The relative amounts of the aforesaid photochromic substances used can vary and depend upon the relative intensities of the color of the activated species of such compounds, and the ultimate color desired.

The photochromic compounds or substances described herein can be applied to or incorporated into the polymerizate by various methods described in the art. In a non-limiting embodiment, the photochromic substance can be dissolved or dispersed within the polymerizate, such as imbibition of the photochromic substance into the polymerizate by immersion of the polymerizate in a hot solution of the photochromic substance or by thermal transfer. In an alternate embodiment, the photochromic substance can be a separate layer between adjacent layers of the polymerizate, such as a part of a polymer film. In another alternate embodiment, the photochromic substance can be applied as a coating or as part of a coating placed on the surface of the polymerizate. As used herein and the claims, the term "imbibition" or "imbibe" includes the permeation of the photochromic substance alone into the polymerizate, solvent assisted transfer absorption of the photochromic substance into a porous polymer, vapor phase transfer, and other such transfer mechanisms.

In a non-limiting embodiment, imbibition of the photochromic substance into the polymerizate can include coating the photochromic article with the photochromic substance; heating the surface of the photochromic article; and removing the residual coating from the surface of the photochromic article.

The amount of photochromic substance or composition containing the same, applied to or incorporated into the polymerizate is not critical and can vary widely. In general, the amount should be sufficient to produce a photochromic effect discernible to the naked eye upon activation. Such amount can be referred to as a photochromic amount. The particular amount used can depend upon the intensity of color desired upon irradiation thereof and upon the method used to incorporate or apply the photochromic substances. Typically, the more photochromic substance applied or incorporated, the greater is the color intensity. In a non-limiting embodiment, the amount of total photochromic substance incorporated into or applied to a photochromic optical polymerizate may range from 0.15 to 0.35 milligrams per square centimeter of surface to which the photochromic substance is incorporated or applied.

In a non-limiting embodiment, the photochromic substance can be added prior to polymerizing, e.g., cast curing, a polymerizable organic composition of the present invention. In this embodiment, the photochromic substance can be chosen such that it is essentially resistant to potentially adverse interactions with initiator(s) that may be present and/or the isocyanate, isothiocyante and amine groups of the first and second components. These adverse interactions can result in deactivation of the photochromic substance, e.g., by trapping them in either an open or closed form.

In a non-limiting embodiment, suitable photochromic substances for use in the present invention can include photochromic pigments and organic photochromic substances encapsulated in metal oxides, the latter of which are described in U.S. Pat. Nos. 4,166,043 and 4,367,170. In a further non-limiting embodiment, organic photochromic substances sufficiently encapsulated within a matrix of an organic polymerizate, as described in U.S. Pat. No. 4,931,220, can be incorporated into the multi-component composition of the present invention prior to curing. In another non-limiting embodiment, the photochromic substance can be incorporated into the second component prior to mixing the first and second components together.

The present invention is more particularly described in the following examples, which are intended to be illustrative only, since numerous modifications and variations therein will be apparent to those skilled in the art. Unless otherwise specified, all parts and percentages are by weight.

Casting Composition Examples

The following summarizes polymerizable casting compositions that are comparative and compositions that are in accordance with the present invention. Casting composition A is a comparative composition, and Casting compositions B and C represent compositions according to the present invention.

Casting Compositions

| Ingredients | Casting Composition A | Casting Composition B | Casting Composition C |
|---|---|---|---|
| CR-39 ® monomer (a) | 100.0 | 99.0 | 99.0 |
| diisopropyl peroxydicarbonate (b) | 2.6 | 3.0 | 3.2 |
| Second monomer (c) | 0 | 1.0 | 0 |
| Second monomer (d) | 0 | 0 | 1.0 |

(a) CR-39 ® diethylene glycol bis(allyl carbonate) monomer available commercially from PPG Industries, Inc.
(b) In each of casting compositions B and C, the level of diisopropyl peroxydicarbonate initiator was adjusted such that tinted polymerizates obtained from these compositions had substantially the same percent transmission as tinted polymerizates obtained (under the same tinting conditions) from composition A, e.g., having about 35 percent transmission. The percent transmittance was determined using a HunterLab Model ColorQuest II colorimeter employing the CIE Tristimulus XYZ scale, illuminant D65 and 10° C. observer.
(c) Diallyl urethane monomer obtained from Sartomer Company, Inc. and having the designation NTX-4434.
(d) Tetraallyl urethane monomer obtained from Sartomer Company, Inc. and having the designation NTX-4439.

Cast Lens Examples

The casting compositions A–C were each mixed at room temperature and injected separately into glass lens molds used to prepare circular lenses having a +5 diopter and an outer rim diameter of 6.5 cm. Twenty (20) lens molds were filled at a time and their contents polymerized using the same cure cycle. The cure cycle used involved heating the molds in an electric forced air oven in stages from 48° C. to 85° C. over a period of 18 hours, followed by cooling to and holding at 60° C. until demolding of the lenses.

The cast lenses were then tinted by imbibing them with a black dye. An aqueous tinting solution of 1 part BPI® Molecular Catalytic™ Black Dye, commercially available from Brain Power Incorporated, and 10 parts deionized water was heated to and held at a temperature of 94° C.–95° C. The lenses cast from casting compositions A–C were fully immersed in the heated dye solution for a period of 5 minutes, after which they were thoroughly rinsed with deionized water. The tinted lenses were evaluated for tinting defects, the results of which are summarized in Table 1.

TABLE 1

Evaluation of Tinted Lenses

| Casting Composition | Number of Tinted Lenses Evaluated | Number of Tinted Lenses Having Tinting Defects (e) | Percent of Tinted Lenses Having Tinting Defects (f) |
|---|---|---|---|
| A | 228 | 57 | 25 |
| B | 529 | 30 | 5.7 |
| C | 436 | 23 | 5.3 |

(e) The lenses were evaluated for tinting defects by means of visual naked eye inspection. Tinting defects were observed as having a lighter colored vein or fern-like appearance relative to the rest of the tinted lens.
(f) 100 × (the number of tinted lenses observed to have tinting defects/the number of tinted lenses evaluated). For example, with casting composition A: 100 × (57/228) = 25 percent (%).

The results summarized in Table 1 show that articles, e.g., lenses, cast from polymerizable compositions according to the present invention, such as Compositions B and C, have fewer tinting defects than lenses cast from comparative compositions, such as Composition A.

Photochromic Article Example

In 98.5 grams of diethylene glycol bis(allyl carbonate) monomer (mid ADC grade), commercially available from PPG Industries, Inc. under the designation CR-39® monomer, was blended 1.5 gm of tetraallyl urethane monomer (TAU)using a magnetic bar. The TAU was obtained from Sartomer Company, Inc. under the designation NTX-4439. The mixture was blended for about 30 minutes. To this blend was added 2.8 gm of diisopropyl peroxydicarbonate (IPP) as a free radical initiator. The mixture was then blended for an additional 10 minutes.

A control sample was prepared using the same procedure with the exception that the sample did not contain TAU monomer.

The resulting mixtures were poured between two flat glass sheets and cured by heating the sheets in an electric forced air oven in stages from 48° C. to 85° C. over a period of 18 hours, followed by cooling to and holding at 60° C. The flat sheets were cut into 1.5"×1.5" square samples which were used for photochromic dye imbibition. A photochromic dye was prepared and imbibed at a temperature of 135° C., for a time period of 4 hours.

Imbibition Coating

The following photochromic mixture was used in the imbibition coating. The total concentration of photochromic in the coating was 4 weight percent. The materials were added in the order and manner shown below, to a vessel equipped with an agitator and a means for heating.

| Material | Weight percent of Imbibition coating |
| --- | --- |
| SOLVENTS | |
| Tetrahydrofurfuryl alcohol | 24.6 |
| Diethyleneglycol dimethylether | 28.7 |
| NMP | 12.3 |
| Dowanol ® PNB | 16.4 |
| SILICA | |
| Hi Sil – T-700 | 1.8 |
| RESIN | |
| Hydroxypropyl cellulose | 9.818 |
| PHOTOCHROMIC DYE PACKAGE | |
| Photochromic No. 3[6] | 0.707 |
| Photochromic No. 4[7] | 0.353 |
| Photochromic No. 5[8] | 0.589 |
| Photochromic No. 6[9] | 1.257 |
| Photochromic No. 7[12] | 0.079 |
| Photochromic No. 8[13] | 0.628 |
| Photochromic No. 9[14] | 0.314 |
| STABILIZER PACKAGE | |
| TINUVIN ® 144 UV Stabilizer[10] | 1.718 |
| IRGANOX ® 3114 Antioxidant | 0.736 |

[6] A Photochromic naphtho[1,2-b]pyran that exhibits a blue color when irradiated with ultraviolet light.
[7] A Photochromic naphtho[1,2-b]pyran that exhibits a blue-green color when irradiated with ultraviolet light.
[8] A Photochromic naphtho[1,2-b]pyran that exhibits a yellow-orange color when irradiated with ultraviolet light.
[9] A Photochromic naphtho[1,2-b]pyran that exhibits a yellow-orange color when irradiated with ultraviolet light.
[10] Hindered amine ultraviolet light stabilizer available from Ciba-Geigy Corporation.
[12] A Photochromic naphtho[1,2-b]pyran that exhibits a yellow-orange color when irradiated with ultraviolet light.
[13] A Photochromic naphtho[1,2-b]pyran that exhibits a yellow-green color when irradiated with ultraviolet light.
[14] A Photochromic naphtho[1,2-b]pyran that exhibits a purple color when irradiated with ultraviolet light.

The imbibition coating was imbibed into the sample sheets by applying a film of the imbibition coating onto the surface of the sample sheets. The film was applied by spin coating. The applied film was allowed to dry. The sample sheets were then heated in a hot-air oven at 135–140° C. for 4 hours. After cooling, the resin film was removed from the test samples by rinsing with water and wiping with an acetone soaked tissue.

The samples were screened for ultraviolet absorbance and test samples having comparable UV absorbance at 390 nanometers were tested for photochromic response on an optical bench. The ultraviolet absorbance value gives an indication of the amount of photochromic compounds in the sample. The optical bench was maintained at a temperature of 72° F. (22° C.). The sample sheets imbibed with the imbibition coating were activated for 15 minutes and the Percent Transmission (%Ta) was measured after 15 minutes.

Prior to testing on the optical bench, the photochromic samples were exposed to 365 nanometer ultraviolet light for about 20 minutes to activate the photochromic compounds and then placed in a 75° C. oven for about 20 minutes to bleach (inactivate) the photochromic compounds. The samples were then cooled to room temperature, exposed to fluorescent room lighting for at least 3 hours and then kept covered for at least 1 hour prior to testing on an optical bench. The bench was fitted with a 300 watt Xenon arc lamp, a remote controlled shutter, a Schott 3 mm KG-2 band- pass filter, which removes short wavelength radiation, neutral density filter(s), a quartz water cell/sample holder for maintaining sample temperature in which the sample to be tested was inserted. Measurements were made on the optical bench in the Photochromic Performance Test with the power output adjusted to 0.67 milliwatts per square centimeter (mW/cm$^2$).

The power output was measured using a GRASEBY Optronics Model S-371 portable photometer (Serial #21536) with a UV-A detector (Serial # 22411) or comparable equipment. The UV-A detector was placed into the sample holder and the light output was measured. Adjustments to the power output were made by increasing or decreasing the lamp wattage or by adding or removing neutral density filters in the light path. A monitoring, collimated beam of light from a tungsten lamp was passed through the sample at 30° normal to the surface of the lens. After passing through the sample sheet, the light from the tungsten lamp was directed through a photopic filter attached to a detector. The output signals from the detector were processed by a radiometer. The control of the test conditions and acquisition of data was handled by the Labtech Notebook Pro software and the recommended I/O board.

The results are shown in Table 2 below.

TABLE 2

| Sample | IPP (wt %) | TAU (wt %) | Imbibition Time (hr) | Photochromic abs @ 390 nm | % Ta (activated) |
| --- | --- | --- | --- | --- | --- |
| Control | 2.8 | 0 | 4 | 0.1889 | 62.4 |
| Invention | 2.8 | 1.5 | 4 | 1.09 | 18 |

These results show that TAU has a significant effect on the photochromic imbibition when compared with a control sample.

The present invention has been described with reference to specific details of particular embodiments thereof. It is not intended that such details be regarded as limitations upon the scope of the invention except insofar as and to the extent that they are included in the accompanying claims.

The invention claimed is:

1. A polymerizable composition comprising:
   (a) a major amount of a radically polymerizable first monomer represented by the following general formula,

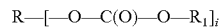

R—[—O—C(O)—O—R$_1$]$_i$ wherein R is a polyvalent residue of a polyol having at least two hydroxy groups, R$_1$ is an allyl group, and i is a whole number from 2 to 4; and
   (b) 0.1 to 5 weight percent based on total weight of the composition of a radically polymerizable second monomer represented by the following general formula,

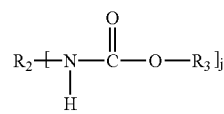

wherein R$_2$ is a polyvalent linking group that is free of urethane linkages; R$_3$ is a residue of a material having a single hydroxy group and at least one allyl group, R$_3$ being free of urethane linkages; and j is a number from 2 to 4.

2. The polymerizable composition of claim 1, wherein j is 3 or 4.

3. The polymerizable composition of claim 1, wherein second monomer (b) is present in an amount ranging from 0.1 to 3 weight percent based on total weight of the composition.

4. The polymerizable composition of claim 1 wherein $R_2$ is a residue of a polyisocyanate selected from aromatic polyisocyanates, aliphatic polyisocyanates, cycloaliphatic polyisocyanates or mixtures thereof; and the material of which $R_3$ is a residue is selected from aromatic alcohols, aliphatic alcohols, cycloaliphatic alcohols, poly(alkylene glycol) allyl ethers, each having at least one allyl group, or mixtures thereof.

5. The polymerizable composition of claim 4 wherein $R_2$ is a residue of a cycloaliphatic diisocyanate selected from isophorone diisocyanate, cyclohexane diisocyanate, methylcyclohexane diisocyanate, bis(isocyanatomethyl)cyclohexane, bis(isocyanatocyclohexyl) methane, bis(isocyanatocyclohexyl)-2,2-propane, bis(isocyanatocyclohexyl)-1,2-ethane, or mixtures thereof, and j is 2.

6. The polymerizable composition of claim 4 wherein the material of which $R_3$ is a residue is selected from $C_2$–$C_4$ alkylene glycol allyl ether, poly($C_2$–$C_4$ alkylene glycol) allyl ether, trimethylol propane di(allyl ether), trimethylol ethane di(allyl ether), pentaerythritol tri(allyl ether), di-trimethylolpropane tri(allyl ether) or mixtures thereof.

7. The polymerizable composition of claim 6 wherein the material of which $R_3$ is a residue is selected from poly(ethylene glycol) allyl ether, poly(1,2-propylene glycol) allyl ether or mixtures thereof.

8. The polymerizable composition of claim 1 wherein R is a residue of a poly($C_2$–$C_4$ alkylene glycol), and i is 2.

9. The polymerizable composition of claim 8 wherein R is a residue of diethylene glycol.

10. A polymerizate formed from the composition of claim 1.

11. A polymerizable composition comprising:
(a) a major amount of a radically polymerizable first monomer represented by the following general formula,

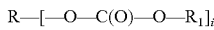

wherein R is a divalent residue of a poly($C_2$–$C_4$ alkylene glycol), $R_1$ is an allyl group, and i is 2; and
(b) 0.1 to 5 weight percent baed on total weight of the composition of a radically polymerizable second monomer represented by the following general formula,

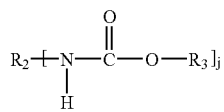

wherein $R_2$ is a divalent linking group that is free of urethane linkages; $R_3$ is a residue of a material having a single hydroxy group and at least one allyl group, $R_3$ being free of urethane linkages; and j is 2.

12. The polymerizable composition of claim 11 wherein $R_2$ is a residue of a cycloaliphatic diisocyanate selected from isophorone diisocyanate, cyclohexane diisocyanate, methylcyclohexane diisocyanate, bis(isocyanatomethyl)cyclohexane, bis(isocyanatocyclohexyl) methane, bis(isocyanatocyclohexyl)-2,2-propane, bis(isocyanatocyclohexyl)-1,2-ethane, or mixtures thereof.

13. The polymerizable composition of claim 12 wherein the material of which $R_3$ is a residue is selected from a poly($C_2$–$C_4$ alkylene glycol) allyl ether, trimethylol propane di(allyl ether), trimethylol ethane di(allyl ether), or mixtures thereof.

14. The composition of claim 13 wherein R is a residue of diethylene glycol, and the material of which $R_3$ is a residue is poly(1,2-propylene glycol) allyl ether.

15. A polymerizate formed from the composition of claim 11.

16. The polymerizate of claim 15 wherein said polymerizate is a lens having a positive diopter.

17. A polymerizable composition comprising:
(a) a major amount of a radically polymerizable first monomer represented by the following general formula,

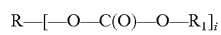

wherein R is a polyvalent residue of a polyol having at least two hydroxy groups, $R_1$ is an allyl group, and i is a whole number from 2 to 4; and
(b) a radically polymerizable second monomer present in said composition in an amount of from 0.1 percent by weight to 5percent by weight based on the total weight of said polymerizable composition, such that a polymerizate of said composition is substantially free of tinting defects, said radically polymerizable second monomer represented by the following general formula,

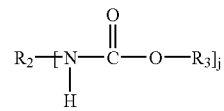

wherein $R_2$ is free of urethane linkages and is a residue of a cycloaliphatic diisocyanate selected from the group consisting of isophorone diisocyanate, cyclohexane diisocyanate, methylcyclohexane diisocyanate, bis(isocyanatomethyl)cyclohexane, bis(isocyanatocyclohexyl)methane, bis(isocyanatocyclohexyl)-2,2-propane, bis(isocyanatocyclohexyl)-1,2-ethane, and mixtures thereof; and the material of which $R_3$ is a residue is selected from the group consisting of aromatic alcohols, aliphatic alcohols, cycloaliphatic alcohols, poly(alkylene glycols)having a single hydroxy group, each having at least one allyl group, and mixtures thereof, $R_3$ being free of urethane linkages; and j is 2.

18. The polymerizable composition of claim 17 wherein the material of which $R_3$ is a residue is selected from the group consisting of $C_2$–$C_4$ alkylene glycol allyl ether, poly($C_2$–$C_4$ alkylene glycol) allyl ether, trimethylol propane di(allyl ether), trimethylol ethane di(allyl ether), pentaerythritol tri(allyl ether), di-trimethyloipropane tri(allyl ether) and mixtures thereof.

19. The polymerizable composition of claim 18 wherein the material of which $R_3$ is a residue is selected from the group consisting of poly(ethylene glycol)allyl ether, poly(1,2-propylene glycol)allyl ether and mixtures thereof.

20. A polymerizable composition comprising:
(a) a major amount of a radically polymerizable first monomer represented by the following general formula,

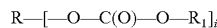

wherein R is a polyvalent residue of a polyol having at least two hydroxy groups, $R_1$ is an allyl group, and i is a whole number from 2 to 4; and (b) a radically polymerizable second monomer present in said composition in an amount of from 0.1 percent by weight to 5 percent by weight based on the total weight of said polymerizable composition, such that a polymerizate of said composition is substantially free of tinting defects, said radically polymerizable second monomer represented by the following general formula,

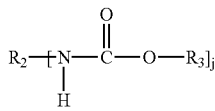

wherein $R_2$ is free of urethane linkages and is a residue of a cycloaliphatic diisocyanate selected from the group consisting of isophorone diisocyanate, cyclohexane diisocyanate, methylcyclohexane diisocyanate, bis(isocyanatomethyl)cyclohexane, bis(isocyanatocyclohexyl)methane, bis(isocyanatocyclohexyl)-2,2-propane, bis(isocyanatocyclohexyl)-1,2-ethane, and mixtures thereof; and the material of which $R_3$ is a residue is selected from the group consisting of $C_2$–$C_4$ alkylene glycol allyl ether, poly($C_2$–$C_4$ alkylene glycol) allyl ether, trimethylol propane di(allyl ether), trimethylol ethane di(allyl ether), pentaerythritol tri(allyl ether), di-trimethylolpropane tri(allyl ether) and mixtures thereof, $R_3$ being free of urethane linkages; and j is 2.

21. The polymerizable composition of claim 20 wherein the material of which $R_3$ is a residue is selected from the group consisting of poly(ethylene glycol)allyl ether, poly(1, 2-propylene glycol)allyl ether and mixtures thereof.

22. A polymerizable composition comprising:
(a) a major amount of a radically polymerizable first monomer represented by the following general formula,

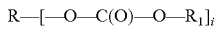

wherein R is a polyvalent residue of a polyol having at least two hydroxy groups, $R_1$ is an allyl group, and i is a whole number from 2 to 4; and (b) a radically polymerizable second monomer present in said composition in an amount of from 0.1 percent by weight to 5 percent by weight based on the total weight of said polymerizable composition, such that a polymerizate of said composition is substantially free of tinting defects, said radically polymerizable second monomer represented by the following general formula,

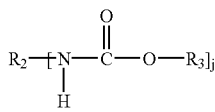

wherein $R_2$ is free of urethane linkages and is a residue of a cycloaliphatic diisocyanate selected from the group consisting of isophorone diisocyanate, cyclohexane diisocyanate, methylcyclohexane diisocyanate, bis(isocyanatomethyl)cyclohexane, bis(isocyanatocyclohexyl)methane, bis(isocyanatocyclohexyl)-2,2-propane, bis(isocyanatocyclohexyl)-1,2-ethane, and mixtures thereof; and the material of which $R_3$ is a residue is selected from the group consisting of poly(ethylene glycol)allyl ether, poly(1,2-propylene glycol) allyl ether and mixtures thereof, $R_3$ being free of urethane linkages; and j is 2.

23. A photochromic article comprising a polymerizate of a polymerizable composition comprising:
(a) a major amount of a radically polymerizable first monomer represented by the following general formula,

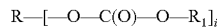

wherein R is a polyvalent residue of a polyol having at least two hydroxy groups, $R_1$ is an allyl group, and i is a whole number from 2 to 4; and (b) 0.1 to 5 weight percent based on total weight of the composition of a radically polymerizable second monomer represented by the following general formula,

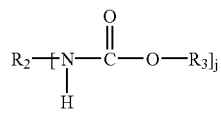

wherein $R_2$ is a polyvalent linking group that is free of urethane linkages; $R_3$ is a residue of a material having a single hydroxy group and at least one allyl group, $R_3$ being free of urethane linkages; and j is a number from 2 to 4.

24. A photochromic article substantially free of tinting defects comprising at least a photochromic amount of a photochromic substance, and an at least partially cured substrate comprising:
(a) a major amount of a radically polymerizable first monomer represented by the following general formula,

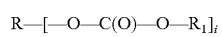

wherein R is a polyvalent residue of a polyol having at least two hydroxy groups, $R_1$ is an allyl group, and i is a whole number from 2 to 4; and (b) 0.1 to 5 weight percent based on total weight of the composition of a radically polymerizable second monomer represented by the following general formula,

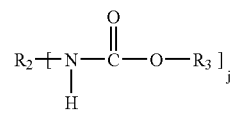

wherein $R_2$ is a polyvalent linking group that is free of urethane linkages; $R_3$ is a residue of a material having a single hydroxy group and at least one allyl group, $R_3$ being free of urethane linkages; and j is a number from 2 to 4.

25. The photochromic article of claim 24, wherein j is 3 or 4.

26. The photochromic article of claim 24 wherein the first monomer (a) comprises diethylene glycol bis(allyl carbonate) monomer.

27. The photochromic article of claim 26 wherein said photochromic substance is at least partially imbibed into said substrate.

28. The photochromic article of claim 26 wherein said photochromic substance comprises at least one naphthopyran.

29. The photochromic article of claim 26 wherein said photochromic substance is chosen from spiro(indoline) naphthoxazines, spiro(indoline)benzoxazines, benzopyrans, naphthopyrans, organo-metal dithizonates, fulgides and fulgimides, or mixtures thereof.

* * * * *